United States Patent
Koike-Akino et al.

(10) Patent No.: US 9,088,447 B1
(45) Date of Patent: Jul. 21, 2015

(54) NON-COHERENT TRANSMISSION AND EQUALIZATION IN DOUBLY-SELECTIVE MIMO CHANNELS

(71) Applicant: Mitsubishi Electric Research Laboratories, Inc., Cambridge, MA (US)

(72) Inventors: Toshiaki Koike-Akino, Salem, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/221,405

(22) Filed: Mar. 21, 2014

(51) Int. Cl.
| | |
|---|---|
| H04L 25/03 | (2006.01) |
| H04B 7/04 | (2006.01) |
| H04L 1/06 | (2006.01) |
| H04L 1/00 | (2006.01) |

(52) U.S. Cl.
CPC ........ *H04L 25/03006* (2013.01); *H04B 7/0413* (2013.01); *H04L 1/0054* (2013.01); *H04L 1/0061* (2013.01); *H04L 1/0606* (2013.01); *H04L 1/0612* (2013.01); *H04L 1/0625* (2013.01); *H04L 25/03821* (2013.01)

(58) Field of Classification Search
CPC ............ H04L 25/03006; H04L 1/0612; H04L 27/2647; H04L 25/0242; H04L 1/0618; H04L 25/0224; H04L 25/0228; H04L 25/024; H04L 25/0202; H04L 25/0206; H04L 27/2607; H04L 27/2613; H04L 27/2626; H04L 1/0054; H04L 25/03821; H04L 1/0606; H04L 1/0625; H04L 1/0061; H04B 7/0413
See application file for complete search history.

(56) References Cited

U.S. PATENT DOCUMENTS

| | | |
|---|---|---|
| 6,801,579 B1 | 10/2004 | Hassibi et al. |
| 7,280,604 B2 | 10/2007 | Giannakis et al. |
| 7,397,866 B2 | 7/2008 | Hwang et al. |
| 7,508,808 B2 | 3/2009 | Marzetta et al. |
| 7,567,623 B2 | 7/2009 | Nam et al. |
| 7,599,444 B2 | 10/2009 | Ashikhmin et al. |
| 7,616,703 B2 | 11/2009 | Bauch et al. |
| 7,864,876 B2 | 1/2011 | Nam et al. |
| 8,031,584 B2 * | 10/2011 | Guthy et al. .................. 370/208 |

(Continued)

OTHER PUBLICATIONS

S.J. Hwang and P. Schniter, "EM-based soft noncoherent equalization of doubly selective channels using tree search and basis expansion," IEEE SPAWC, 2009.

(Continued)

*Primary Examiner* — Hirdepal Singh
(74) *Attorney, Agent, or Firm* — Dirk Brinkman; Gene Vinokur

(57) ABSTRACT

A method and system realize reliable wireless communications in non-coherent multiple-input multiple-output (MIMO) doubly-selective channels. The method uses Grassmannian space-time-frequency block codes and an iterative generalized likelihood ratio test (GLRT) with a multi-dimensional basis expansion model (BEM), decision reordering, and a fixed number of surviving candidates. The computational complexity of a non-coherent MIMO equalizer becomes linear as a function of a code length and a size of a modulation alphabet. The codebook, the alphabet size, the bit labeling, and the block power are optimized using worst-case channel statistics or instantaneous channel states. The method can use soft-information feedback from error correction codes, such as low-density-parity-check codes to improve performance.

17 Claims, 10 Drawing Sheets

(56) References Cited

U.S. PATENT DOCUMENTS

| | | | |
|---|---|---|---|
| 8,059,747 B1* | 11/2011 | Orlik et al. | 375/267 |
| 2002/0163892 A1 | 11/2002 | Hassibi et al. | |
| 2004/0013180 A1 | 1/2004 | Giannakis et al. | |
| 2004/0228271 A1 | 11/2004 | Marzetta et al. | |
| 2007/0082624 A1 | 4/2007 | Jung et al. | |
| 2009/0103666 A1* | 4/2009 | Zhao et al. | 375/341 |
| 2010/0322429 A1* | 12/2010 | Norvell et al. | 381/22 |
| 2012/0094618 A1* | 4/2012 | Harada et al. | 455/84 |
| 2012/0327994 A1* | 12/2012 | Hrycak et al. | 375/233 |
| 2013/0094605 A1* | 4/2013 | Larsson | 375/295 |
| 2013/0182754 A1* | 7/2013 | Das et al. | 375/232 |
| 2014/0348120 A1* | 11/2014 | Kant et al. | 370/329 |
| 2015/0003508 A1* | 1/2015 | Lee et al. | 375/224 |

OTHER PUBLICATIONS

K. Fang and G. Leus, "Space-time block coding for doubly-selective channels," IEEE Trans. Signal Processing, vol. 58, No. 3, pp. 1934-1940, 2010.

X. Ma and G. B. Giannakis, "Space—time—multipath coding using dig- ital phase sweeping or circular delay diversity," IEEE Trans. Signal Processing, vol. 53, No. 3, pp. 1121-1130, Mar. 2005.

* cited by examiner

NON-COHERENT TRANSMISSION AND EQUALIZATION IN DOUBLY-SELECTIVE MIMO CHANNELS

FIELD OF THE INVENTION

This invention relates generally to digital communications and more particularly to transmitting high-speed data over wireless communications channels.

BACKGROUND OF THE INVENTION

In wireless communications, doubly-selective channels are subject to a time-varying multi-path fading, which leads to both inter-carrier interference (ICI) and inter-symbol interference (ISI) when multi-carrier transmission schemes are employed. This is a particular problem in a wideband wireless network with mobile transceivers, e.g. in vehicular communications networks and millimeter-wave cellular networks where the velocities of the communicating entities can be large and will cause rapid variation in the wireless channel. Adaptive equalization and pilot symbols are normally used to compensate for these fading effects. However, the pilot symbols reduce the spectrum efficiency and data transmission rate given finite radio frequency resources. Moreover, the pilot symbols are only effective for slow fading channels. Channel estimation to obtain channel state information (CSI) is considerably more difficult in doubly-selective fading channels due to the presence of both ISI and ICI.

Several transmission data formats, including differential modulations, can be used for non-coherent communications, which do not rely on any pilots. Such transmission formats work well either for time-selective slow fading or for frequency-selective fading channels. However, for highly-selective fading in both time and frequency domains (i.e., doubly-selective fading), conventional non-coherent transmission schemes degrade significantly.

A basis expansion model (BEM) has been used to approximate singly-selective fading channels. The BEM is used for an iterative semi-blind equalizer based on an expectation-and-maximization (EM) procedure. With help of error correcting codes (ECC), BEM can realize quasi non-coherent communications with a relatively small number of pilot symbols. However, this technique still relies on pilot symbols and ECC soft-decision feedbacks, and no techniques are known that work in purely non-coherent communications over doubly-selective fading channels without any pilot symbols at all.

Another important technique in wireless communications is spatial, temporal, and frequency diversity techniques that reduce a probability that the channel fades deeply on all diversity branches simultaneously. It has been verified that multiple-input multiple-output (MIMO) techniques, which use multiple transmit and receive antennas for spatial diversity or multiplexing, can significantly improve the communications reliability or the channel capacity. For advanced radio communications, most transceivers are often equipped with multiple antennas to achieve the MIMO gain.

For non-coherent communications over MIMO flat-fading channels, it has been theoretically shown that an orthogonal space-time block code (STBC) over a Grassmannian manifold can achieve the channel capacity. However, STBC does not perform well for non-coherent MIMO doubly-selective fading channels due to the strong ISI and ICI. Because the ISI and ICI cause a severe error floor, the maximum spectrum efficiency is seriously restricted.

SUMMARY OF THE INVENTION

The embodiments of the invention provide a method and system for wireless telecommunications via multiple-input multiple-output (MIMO) doubly-selective channels that are subject to time-varying fading and multi-path delays. The embodiments realize non-coherent MIMO communications without relying on pilot symbols at all. The embodiments use a multi-dimensional basis expansion model (BEM) to cope with doubly-selective fading channels, and a linear-complexity blind equalization based on generalized likelihood ratio test (GLRT).

In one embodiment, the GLRT blind equalization with BEM is expanded to maximum-likelihood (ML) blind equalization, which exploits channel statistics. The time-domain selectivity is expressed by a Legendre polynomial basis, and the frequency-domain selectivity is represented by a Fourier basis. The embodiments can also use Grassmannian space-time-frequency block codes (STFBC) and soft-decision-feedback blind equalization. Some different mapping schemes of differential STFBC are designed according to the channels statistics. To suppress error propagation in the receiver, the decision order is adaptively optimized through the GLRT or ML blind equalization.

One embodiment of the invention uses soft-information feedback from forward error correction (FEC) codes, such as low-density parity-check (LDPC) codes, to improve performance. In another embodiment, a differential unitary STFBC is used with varying power allocation and modulation level over time or frequency to further suppress error propagations. The constellation and labeling are adjusted for ISI and ICI given typical, worst-case, or instantaneous channel statistics.

DETAILED DESCRIPTION OF THE PREFERRED EMBODIMENTS

System and Method Overview

Figure 1:
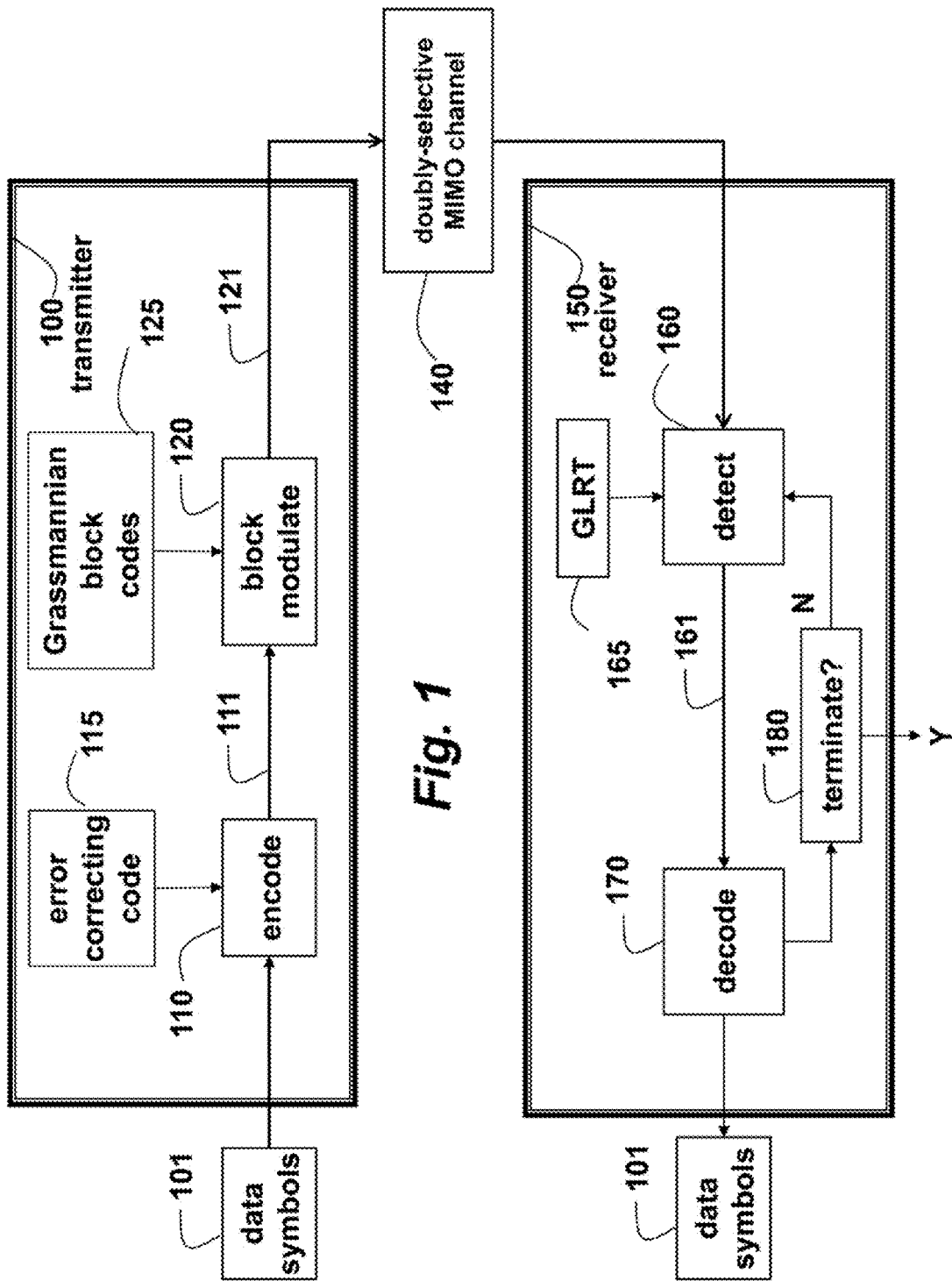
FIG. 1 is flow chart of a method of the invention for a schematic of non-coherent communications over doubly-selective fading MIMO channels according to embodiments of the invention.

As shown in FIG. 1, the embodiments of the invention provide a method and system for wireless communications between transmitter 100 and receiver 150 via a non-coherent MIMO doubly-selective channel that is subject to time-varying fading and multi-path delays. The time-varying fading causes inter-carrier interference (ICI), and the multi-path delays cause inter-symbol interference (ISI). The system can transmit high-speed data even for the case where the transceivers move extremely fast, e.g., cellular telephones carried in bullet trains and airplanes.

An encoder 110 in a transmitter 100 encodes 110 a sequence of data symbols 101 with an error correcting code (ECC) 115 to produce encoded data symbols 111. The encoder can use capacity-approaching forward error correction (FEC) codes, e.g., low-density parity-check (LDPC) codes, turbo codes, repeat-accumulate codes, or other similar codes. For latency-critical cases, short-length FEC codes, such as BCH, Reed-Muller, and Reed-Solomon codes, may be applied.

The encoded data symbols are block-wise modulated 120 to a radio frequency (RF) signal 121 by a Grassmannian block code 125. The block code can include a unitary space-time block code (STBC), a unitary space-frequency block code (SFBC), or a unitary space-time-frequency block code (STFBC). The block code can also include quasi-unitary beta-distributed space-time modulations, and can be concatenated with trellis coding. These block codes can realize non-coherent communications, in which no pilot symbols are required. Therefore, the spectrum efficiency loss from pilot insertion overhead can be avoided. Nevertheless, a few scattered pilot symbols can be also inserted to improve performance. To suppress the impact of ISI, multi-carrier orthogonal-frequency-division multiplexing (OFDM) can be used. To remove the inter-block interference, we may use cyclic prefix or zero-padding guard interval. The other precoding and filtering with power and rate optimization can be applied concurrently. The RF signal is transmitted to the receiver 150 via the doubly-selective channel 140.

The receiver detects 160 an output 161 from the channel, using a generalized likelihood ratio test (GLRT) 165 with multi-dimensional basis expansion model (BEM). The output is decoded 170 to reproduce the data symbols. The decoding with belief propagation for LDPC codes is used. The detecting and decoding are iterated until a termination condition 180 is reached (Y). The termination condition can be based on the convergence of the data likelihood, or a predetermined number of iterations.

Details

Non-Coherent Doubly-Selective MIMO Channels

When the transceivers move fast, a state of the wireless channel can change rapidly over little time to cause time-selective fading and ICI. In addition, wideband signal transmission is subject to ISI due to multi-path delays, which causes frequency-selective fading. The doubly-selective wireless communications channels suffer from both ISI and ICI. To avoid deep signal fading, diversity techniques are used over time and frequency domains. To take advantage of spatial diversity, in addition to the time and frequency diversity domains, the transceivers can be equipped with multiple antennas, e.g., M transmit antennas and N receive antennas, where M and N are integers of value two or greater. This invention is also applicable to single-antenna systems, i.e., M=N=1

To realize non-coherent communications, the transmitter according to embodiments of the invention transmits data with well-designed modulation formats, the Grassmannian STBC/SFBC/STFBC including differential unitary space-time modulations (STM). Because the embodiments can realize fully non-coherent communications, the pilot symbols for channel state information (CSI) acquisition are not required, but could be optional.

Inflating-Block GLRT Blind Equalization

Figure 2:
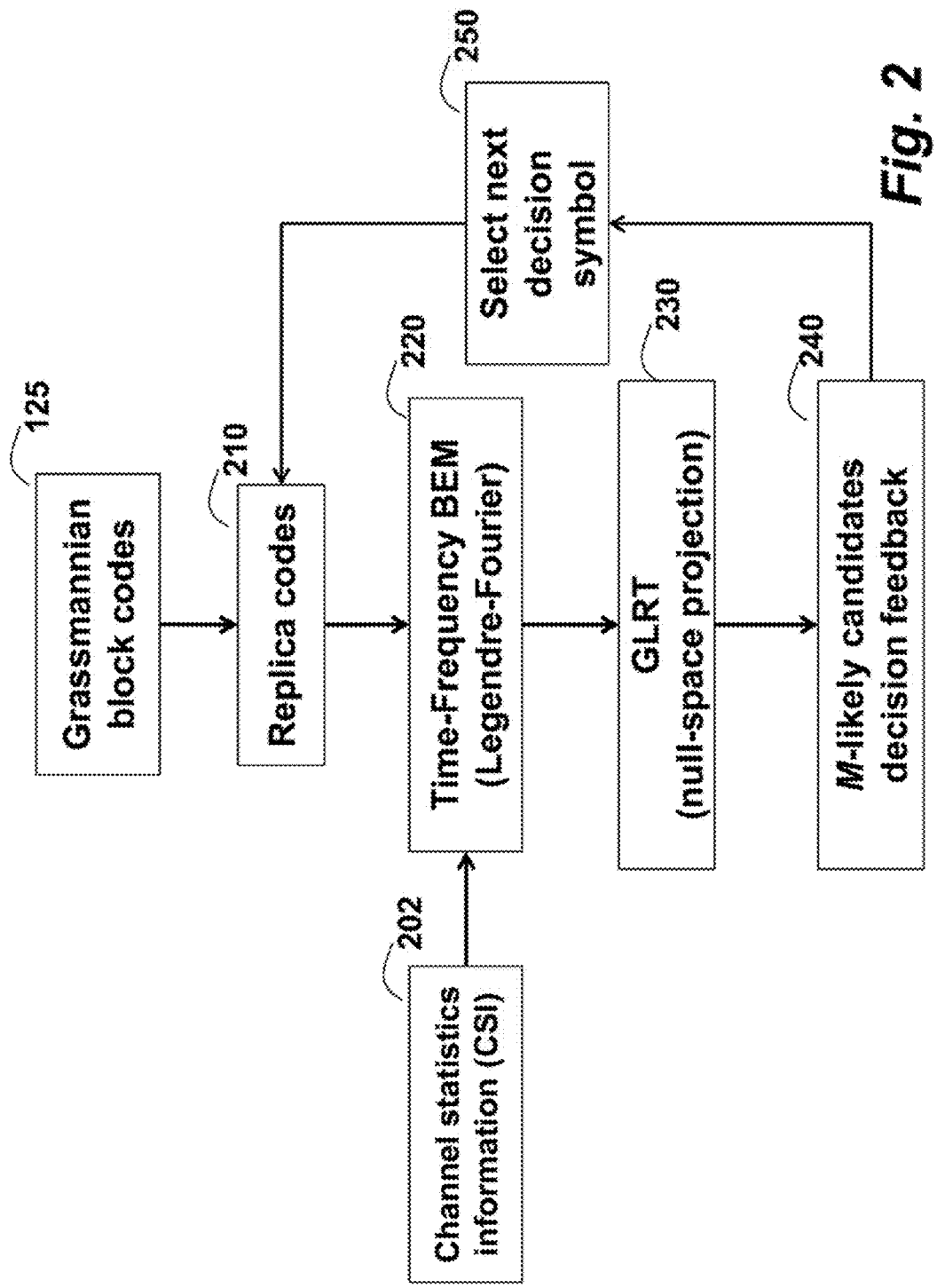
FIG. 2 is flow chart of a procedure for blind equalization for doubly-selective fading channels according to embodiments of the invention.

FIG. 2 shows the schematic of the non-coherent MIMO equalization method according to some embodiments of the invention. At the receiver, the multi-symbol detection is sequentially performed by expanding the decision symbol lengths. With the Grassmannian block codes 125, the block code replica 210 is expanded 220 according to a multi-dimensional Fourier-Legendre BEM. The number of the basis functions is chosen according to the available CSI 202. The CSI can include signal-to-noise ratio (SNR), power delay profile (PDP), and the maximum Doppler frequency. The method does not need the exact CSI, but a worst-case situation considers the maximum possible transceiver speed, minimum possible SNR, etc.

With the multi-dimensional BEM, the received signals can be represented by $$Y = B(I \tilde{X}) H + W,$$

where Y is a K×N receive signal matrix, B is a K×DK basis expansion matrix, $\tilde{x}$ is a Kronecker matrix product, I is an identity matrix, X is a K×M transmit signal matrix, H is a DM×N expanded channel matrix, W is a K×N additive Gaussian noise matrix, K is the block length, and D is the number of basis functions used for multi-dimensional BEM.

Because pilot symbols are not required, the channel matrix H is unknown, and the receiver cannot obtain the instantaneous CSI. Instead of obtaining the channel matrix, H, the likelihood test is carried out over all possible codewords by the GLRT projecting 230 the received signal onto a quasi-null space of the basis-expanded codewords. More precisely, the embodiments use basis-expanded GLRT detection, which searches for a most-likely STFBC signal X from the received signal Y without having the channel matrix H as $$\hat{X} = \underset{X \in C}{\operatorname{argmin}} \left\| (I - B(I \otimes X)((I \otimes X^\dagger) B^\dagger B(I \otimes X))^{-1} (I \otimes X^\dagger) B^\dagger) Y \right\|^2$$

where C is the set of possible STFBC codewords, and \ is conjugate transpose operator. When precise channel statistics are available, the null space can be improved to generalized nulling with a noise variance and eigenvalues of the channel covariance.

Several likely candidates 240 are fed back for equalizing the next selected decision symbol 250. The equalization process is carried out over all pairs of the past surviving candidates and the next symbol. Here, the next symbol to be detected can be adaptively selected, in which an effective ISI/ICI of the symbol is low. This decision ordering process can improve performance by preventing decision-error propagation. The method iterates until termination.

The embodiments provide a way to reduce the complexity into a linear order by successive expansion that gradually increases the block size and the basis expansion with likely candidate symbols retained as M-algorithm survivors, e.g., from a Soft-Output M-Algorithm (SOMA) with a reduced-complexity trellis decoder. The number of candidates can be also adaptively set up with a threshold by using T-algorithm. The T-algorithm is a breadth-first trellis decoding for sequence estimation in digital data transmission. The expansion can iterate over several blocks with or without forward error correction (FEC).

Multi-Dimensional BEM

Optimal basis vectors can be given by a Karhunen-Loeve transform (KLT) basis, which provides dominant eigenvectors of a channel auto-correlation matrix.

Figure 3:
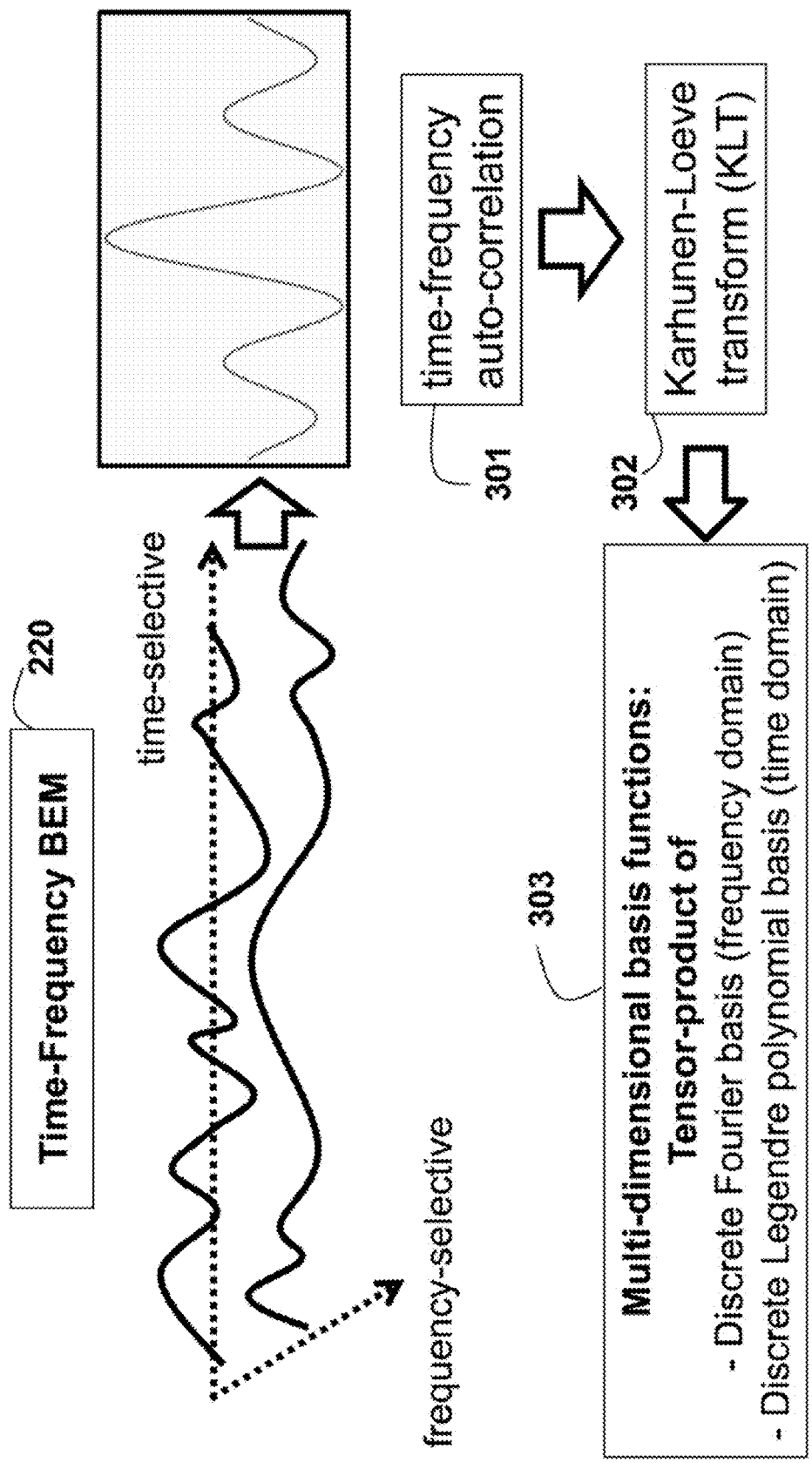
FIG. 3 is a schematic of multi-dimensional BEM using Fourier-Legendre basis functions according to embodiments of the invention.

FIG. 3 shows a schematic of generating basis functions with multi-dimensional (time-frequency BEM 220 with Legendre-Fourier basis for doubly-selective fading channels. The channel varies in time and frequency according to Doppler spectrum and delay spectrum. The auto-correlation functions over time and frequency can be decomposed into time domain auto-correlation and frequency domain auto-correlation 301.

Using the KLT 301 of the decomposed auto-correlation functions, the multi-dimensional time-domain basis 303 becomes a discrete Legendre polynomial basis, whereas the frequency-domain basis is a discrete Fourier (exponential) basis. The discrete Legendre polynomial basis is used up to reasonably fast fading channels (i.e., no more 10% maximum Doppler frequency normalized by block length), while the Legendre basis is modified to sinusoidal basis for extremely fast fading channels. Considering the spatial auto-correlation, this multi-dimensional BEM can also treat a spatial correlation caused by line-of-sight channels or antenna coupling.

The time-domain basis (Legendre polynomial basis) is used to deal with ICI. To obtain the ICI channel matrix, the Legendre polynomial basis, over the time domain, is transformed to the frequency domain via the discrete Fourier transform. For most cases where the Doppler frequency normalized by block length is less than 10%, 2-basis expansion is sufficient to reduce the ICI. To reduce ISI, additional a few Fourier basis functions are used as a multi-dimensional BEM matrix B.

Detection Ordering

Figure 4:
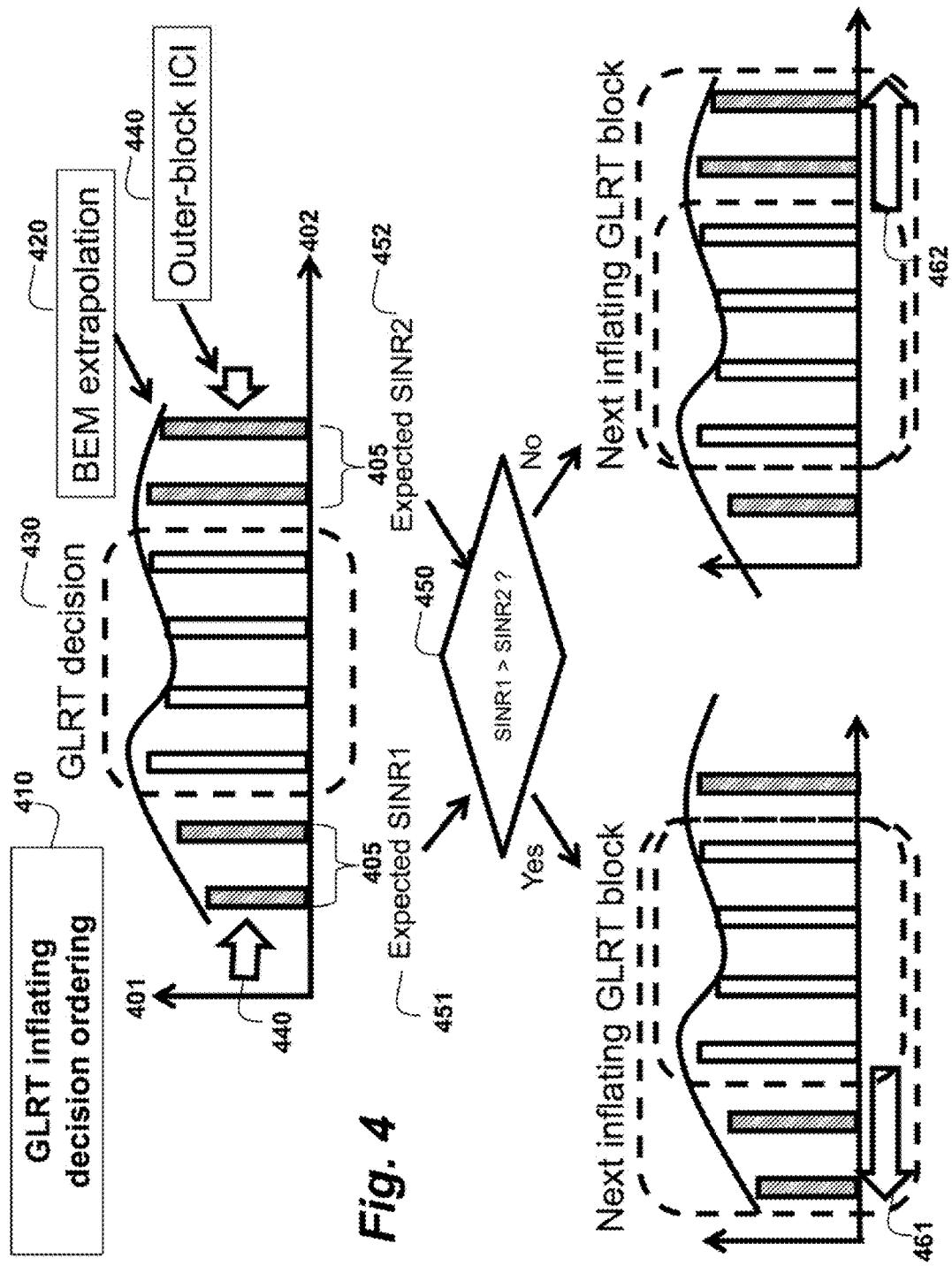
FIG. 4 is a schematic of decision ordering, where the next equalization block is determined by expected SINR based on BEM extrapolation according to embodiments of the invention.

FIG. 4 shows a schematic of detection ordering 410 along inflating GLRT blind equalization as a next symbol detector 250. The figure shows the power 401 of the signal as a function of subcarrier frequencies 402, The multi-dimensional BEM extrapolation 420 can estimate the expected SINR of out-block subcarriers 405 subject to ICI 140 after the GLRT decision 430 is made.

This embodiment provides the way to choose the best subcarriers to detect next by comparing 450 the expected SINRs 451-452, e.g., SIN1>SIN2. When the SINR at lower subcarriers is higher than the SINR1 at higher subcarriers (Y), the GLRT increases (inflates) 461 the block length to detect lower subcarriers. Similarly, if the SNR2 is higher (N) the higher subcarriers are inflated 462. This detection ordering can mitigate the decision error propagation and can reduce the required survivors.

Precoding

One embodiment uses precoding before RF transmissions. To reduce ISI, a discrete inverse Fourier transform can be used as a precoding matrix as known for OFDM. Time domain single-carrier transmission with identity matrix precoder and any other multi-tone transmissions such as wavelet precoder or Hadamard precoder are also applicable. The method of the invention can further adapt the precoding matrix, such that the total ISI and ICI are minimized, by gradient methods when the statistical CSI is known.

With a sufficiently long cyclic prefix (CP), OFDM can transform frequency-selective fading channels to multiple frequency-flat fading channels for each subcarrier. A fluctuation of the subcarrier channel over frequency is a superposition of Fourier (exponential) basis functions. The ICI is modeled by Legendre polynomial basis. Hence, the Fourier-Legendre basis expansion can jointly model the ICI and ISI channels.

ISI/ICI-Aware Codebook Design

Figure 5:
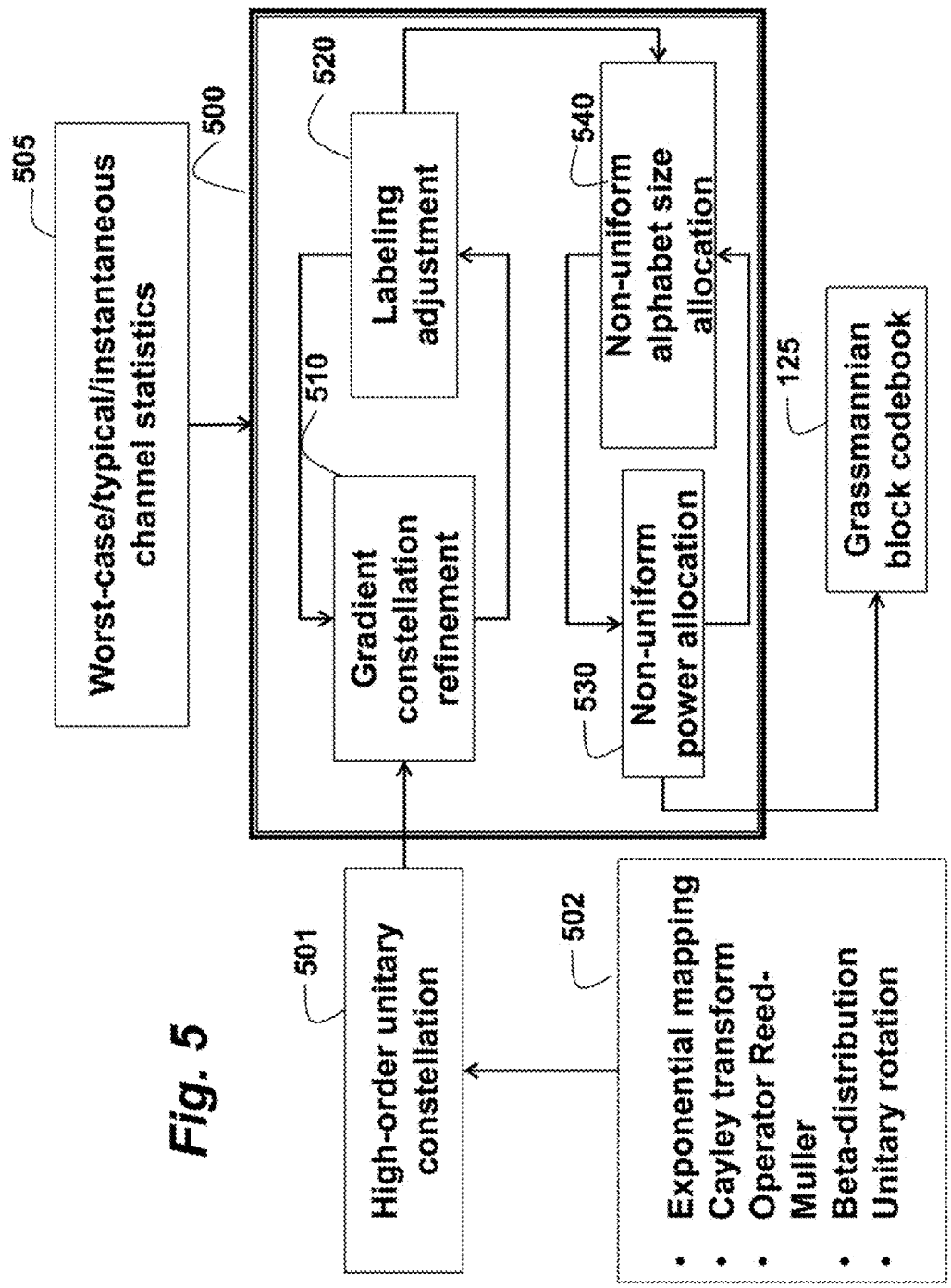
FIG. 5 is flow chart of a procedure for ISI/ICI-aware block codebook design according to embodiments of the invention.

As shown in FIG. 5, the embodiments provide a way to construct the Grassmannian codebook 125 for the basis-expanded GLRT so that the basis-expanded codeword is full-rank to maximize diversity gains. The schematic in FIG. 5 shows a codebook design procedure 500 for highly dispersive doubly-selective fading channels. The codebook is designed by high-order differential unitary space-time constellation coding 501, such as exponential mapping, Cayley transform, operator Reed-Muller, beta-distributed random methods, and unitary rotation 502. This codebook is numerically optimized and refined using a gradient procedure 310, by considering a pairwise codeword distance:

$$tr[B(I\hat{x}(X_i-X_j))A(I\hat{x}(X_i-X_j)^\dagger)B^\dagger]$$

$$det[B(I\hat{x}(X_i-X_j))A(I\hat{x}(X_i-X_j)^\dagger)B^\dagger]$$

where "tr" is a trace and "det" is a determinant for low SNR and high SNR regimes. To optimize the code at a specific SNR, the codes should have the maximum metric of $$tr+\rho\ det$$

where tr is the above-mentioned trace metric, det is the determinant metric, and p is the SNR.

Here, the matrix A contains eigenvalues of the basis-expanded channel matrix H. The eigenvalues can be pre-computed by considering a typical doubly-selective channels with a maximal Doppler frequency and a power delay profile. It is not necessary that the matrix A perfectly matches the exact channel statistics at the design phase. To improve performance, the codebook can be dynamically adapted by feeding back CSI statistics 505 from the transmitter. The statistics can be worst-case, typical, or instantaneous.

After the gradient constellation refinement, the labeling adjustment 520, which indicates how to map digital bits on each the high-dimensional constellations, is optimized by numerical simulated annealing to minimize the error probability bound. The constellation update and labeling optimization are iterated until convergence.

The optimized codebook is mapped to space-time-frequency domain dimensions. The method of the invention optimizes the block assignment with non-uniform alphabet-size 540 and non-uniform power 530 allocation. Assigning different alphabet size and power for odd- and even-index subcarriers can improve performance by preventing error propagations and by minimizing ICI and ISI for successive GLRT detection. Allocating higher power block codes at the first subcarrier, and gradually decreasing power can also prevent error propagations.

Unitary Rotation Codes

Figure 6:
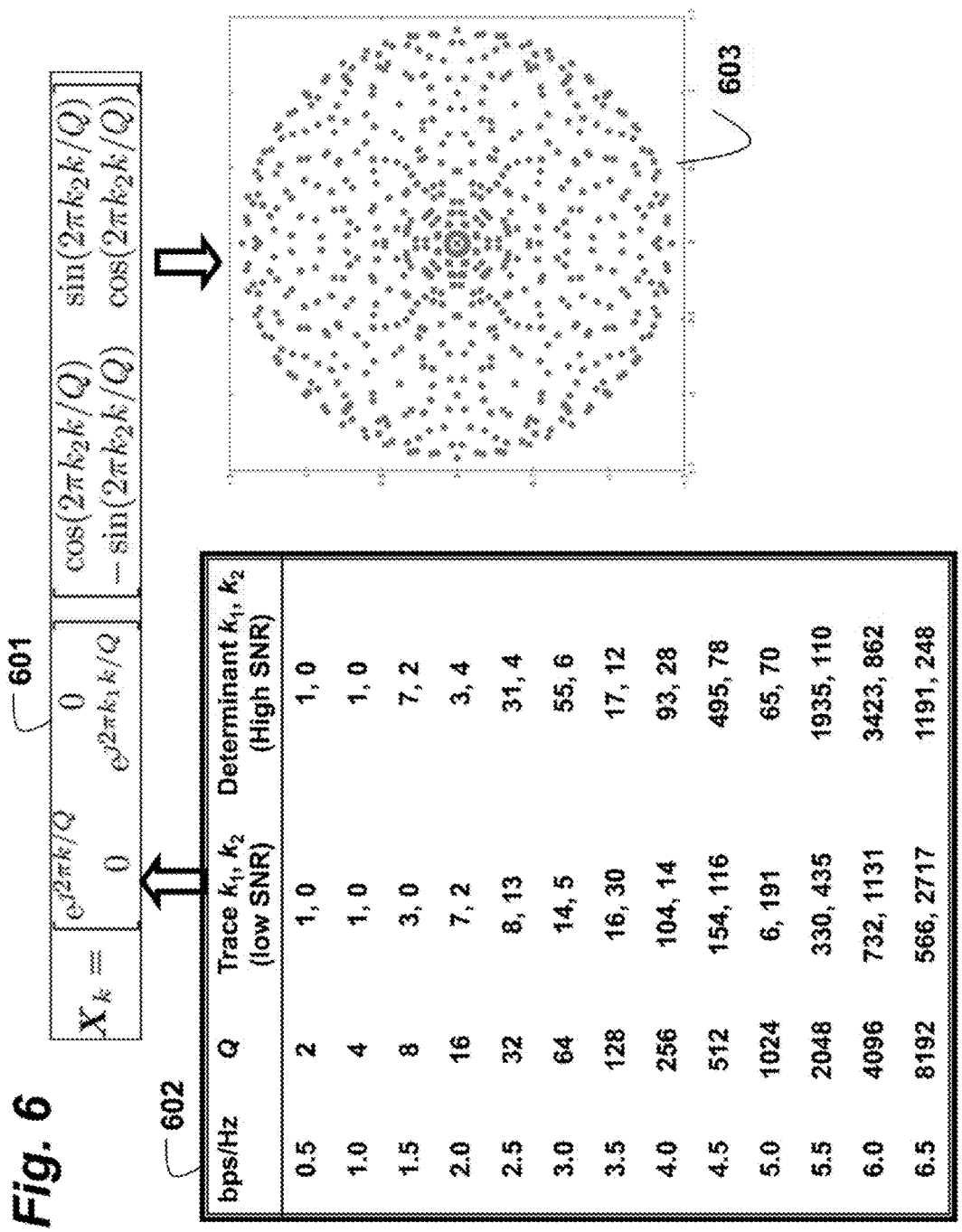
FIG. 6 is a schematic of unitary constellation based on two rotation matrices of size 2×2 with optimized parameters up-to 6.5 bps/Hz for both low and high SNR regimes according to embodiments of the invention.

FIG. 6 shows a schematic of the unitary rotation codes 501 for the case of 2-antenna transmissions. Two sets of 2×2 unitary matrices are used to generate the $k^{th}$ constellation $X_k$ 601 according t:

$$X_k = \begin{bmatrix} e^{j2\pi k/Q} & 0 \\ 0 & e^{j2\pi k_1 k/Q} \end{bmatrix} \begin{bmatrix} \cos(2\pi k_2 k/Q) & \sin(2\pi k_2 k/Q) \\ -\sin(2\pi k_2 k/Q) & \cos(2\pi k_2 k/Q) \end{bmatrix},$$

where the parameter $k_1$, $k_2$, and Q are optimized to maximize the trace-metric codeword distances or determinant-metric codeword distances for different spectrum efficiency. Optimized parameters 602 are listed for 0.5 to 6.5 bps/Hz and for low and high SNR regimes. The parameters can be different for different channel conditions and the number of receiving antennas. The parameters $k_1$, $k_2$, and Q can be non-integer as well. The unitary rotation codes generate 2×2 unitary matrix codewords, whose entry can be viewed as a superposition of some phase shift keying (PSK) signals 603.

Figure 7:
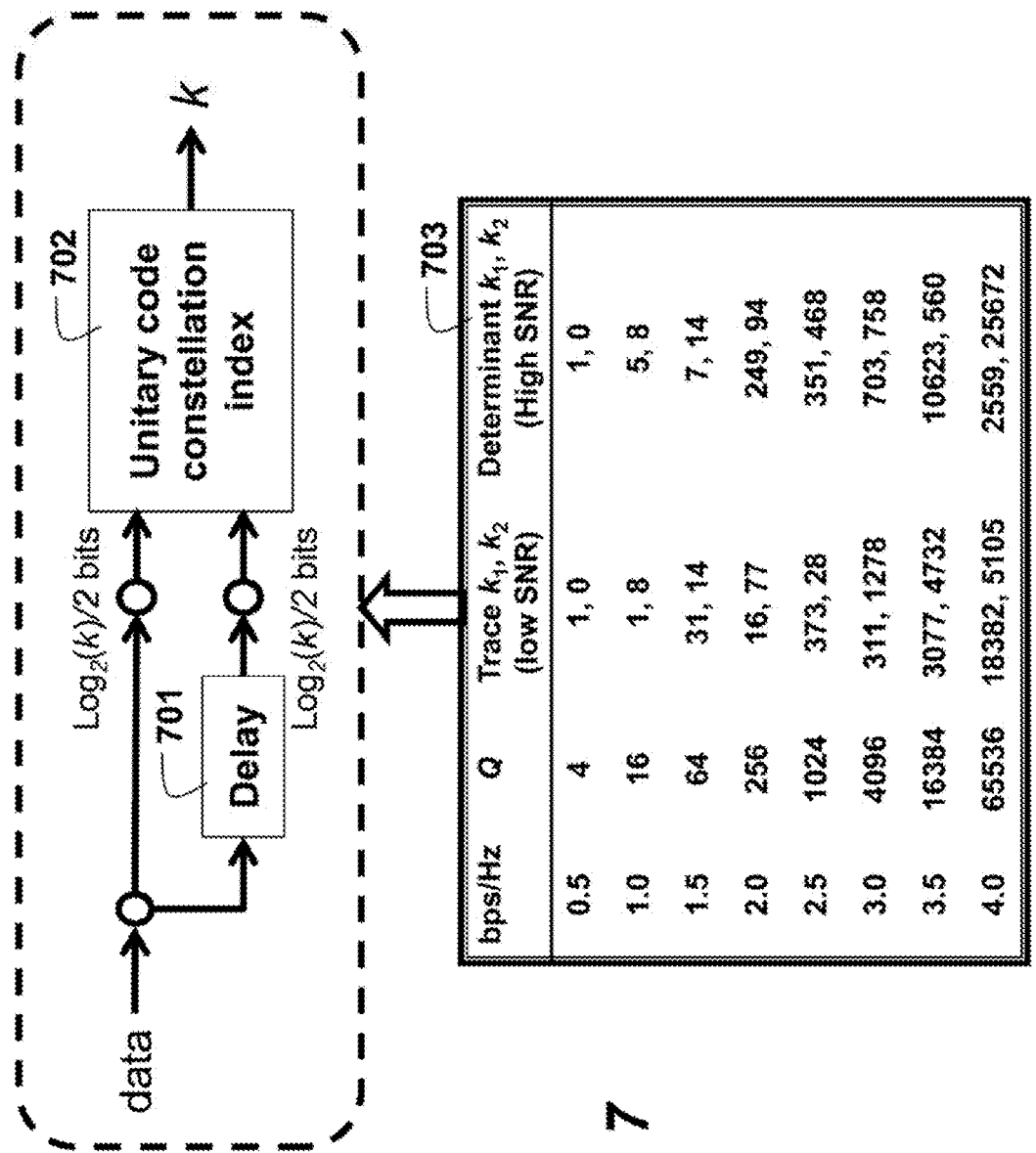
FIG. 7 is a schematic of trellis-coded unitary constellation with optimized parameters according to embodiments of the invention.

The rotation codes can be extended to trellis-coded unitary constellations as shown in FIG. 7 using a delay 701 and a unitary code constellation index 702, where the unitary constellation is chosen by the data and the delayed data. This convolutional structure allocates the necessary memory to increase the codeword distance along the trellis diagram. The memory size depends on the constraint length, i.e., how much of the delayed data are used. For the case of constraint length of 2, the optimized parameters $k_1$, $k_2$, and Q are listed 703 in FIG. 7 for 0.5 to 4.0 bps/Hz. The trellis coding is effective to mitigate the impact of ICI and ISI. The inflating GLRT equalization is suited for decoding trellis-coded unitary constellations because the computational complexity does not increase owing to the M-algorithm.

Labeling and Constellation Optimization

Figure 8:
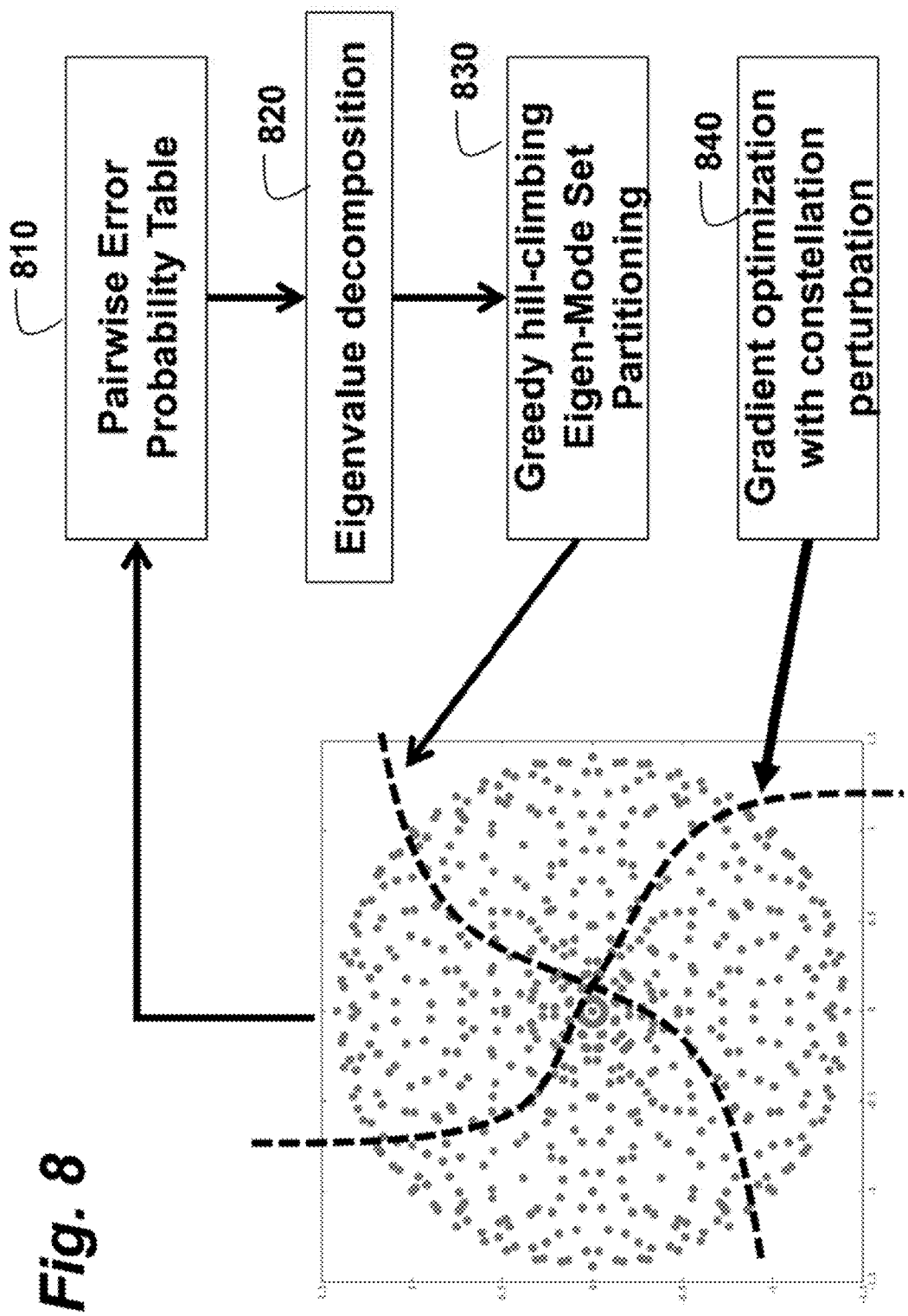
FIG. 8 is a schematic of labeling optimization based on greedy set partitioning, and constellation refinement based on gradient updates according to embodiments of the invention.

FIG. 8 shows a schematic of the labeling adjustment 520 and gradient constellation refinement 510. Given the Grassmannian or unitary constellations, the pairwise error probability is computed 810 to obtain the union bound. The table of the union bound is decomposed by eigenvalue decomposition 820 to optimize the bit assignment for constellations. The dominant eigenvectors can indicate the best set partitioning 830 for labeling the high-order and high-dimensional STFBC.

The worst pair among the union bound table can be compensated by modifying the constellation point with a gradient update 840. This can create non-unitary constellations, whereas the bit error rate can be minimized by quasi-unitary modulations.

Figure 9:
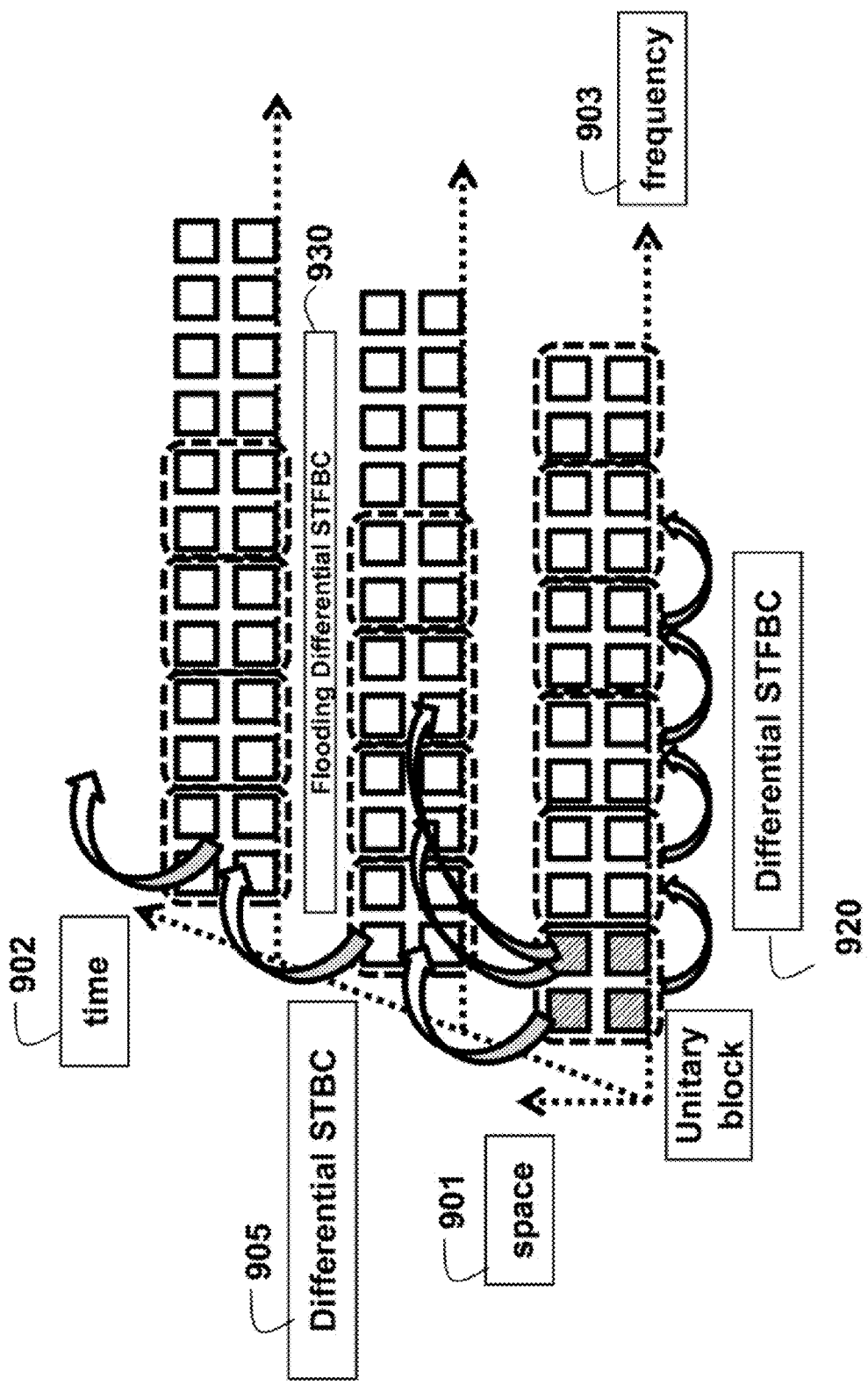
FIG. 9 is a schematic of STBC, SFBC, and STFBC, where differential coding is carried out along different orders in time and frequency domain according to embodiments of the invention.

FIG. 9 shows a schematic of mapping the unitary constellation over space 901, time 902, and frequency 903. One embodiment uses differential SFBC 905, where the differential encoding is applied for adjacent subcarriers along the frequency domain. One can use the differential STBC, where the differential encoding is carried out along the time domain. The STFBC 920 can exploit all possible space, time, and frequency domains in any order. The flooding order 930 can be optimized according the channel statistics, i.e., auto-correlation functions over time and frequency. The embodiments do not require differential encoding but Grassmannian manifold constraint (i.e., spatially orthogonal and uniquely distinguishable).

Non-Uniform Power Allocation and Constellation Assignment

Figure 10:
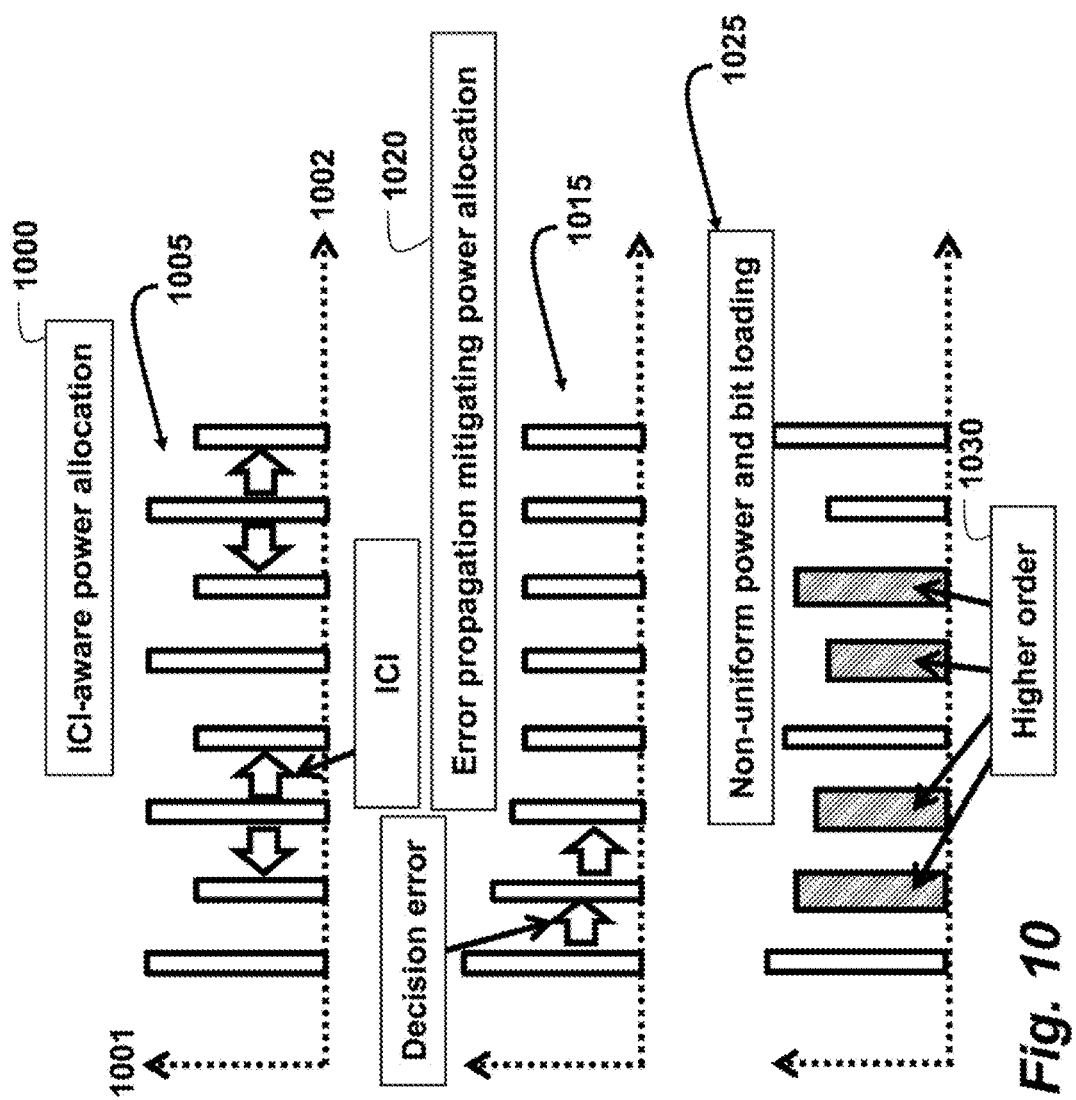
FIG. 10 is a schematic of non-uniform constellation and power allocation to mitigate ISI, ICI, and decision error propagations according to embodiments of the invention.

FIG. 10 shows ICI-aware power 1001 allocation 1000 as a function of subcarrier frequency 1002 to explain the schematic of non-uniform power allocation 530 and non-uniform constellation assignment 540 of FIG. 5. One embodiment uses gap-toothed power allocation 1005 to mitigate the impact of ICI 1010*t*, for which the detection is first taken place for higher power subcarriers. Another embodiment uses power decreasing allocation 1015 so that the decision error propagation 1020 is minimized and the overall performance is optimized. Another embodiment uses non-uniform power allocation and bit loading 1025 for high order subcarriers 230.

Given channel statistics (not necessarily instantaneous channels), the constellation size as well as power can be optimized for each subcarrier. To keep the overall spectrum efficiency, the average number of bits is not changed. The invention can be applied for any channels in optical communications as well as in radio communications.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for communicating data symbols in a network, comprising:
    transmitting, by a transmitter via a channel, data symbols using modulation of a block code for non-coherent transmission;
    modeling the channel using the space-time-frequency basis expansion to represent inter-symbol interference (ISI) due to multi-path delays and inter-carrier interference (ICI) due to time-varying fading;
    approximating the channel by a dominant Karhunen-Loeve transform (KLT) basis vectors, wherein a Legendre polynomial basis may be used over a time domain, and a Fourier basis may be used over a frequency domain; and
    detecting a received signal, wherein the detecting uses a generalized likelihood ratio test (GLRT) with soft-in soft-out space-time-frequency basis expansion to reproduce the data symbols, wherein a multi-dimensional basis expansion model (BEM) is used.

2. The method of claim 1, comprising the steps:
    encoding, in the transmitter, the data symbols to produce encoded data symbols for forward error correction (FEC);
    modulating the encoded data symbols using a space-time-frequency block code for diversity;
    precoding the modulated signals using a cyclic prefix;
    filtering the modulated signals using a band-path filter to produce a radio frequency (RF) signal;
    transmitting the RF signal via the channel to the receiver;
    decoding the output to reproduce the data symbols; and
    iterating the detecting and decoding until a termination condition is reached.

3. The method of claim 2, wherein the channel is a doubly-selective fading channel subject to time-varying fading and multi-path delays and uses non-coherent techniques.

4. The method of claim 2, wherein the block code is selected from a group consisting of a unitary space-time block code (STBC), a unitary space-time-frequency block code (STFBC), a differential space-time-frequency trellis block code (STFTBC), a Grassmannian block code, and a non-unitary beta-distributed STBC, so that the receiver can detect the data symbols without explicitly estimating the channel form pilot symbols transmitted via the channel.

5. The method of claim 2, wherein the FEC is selected from the group consisting of a low-density parity-check (LDPC) code, a turbo code, and a repeat-accumulate code.

6. The method of claim 2, wherein the decoding uses belief propagation (BP) or linear programming (LP) iterations.

7. The method of claim 1, further comprising:
    precoding the data symbols, wherein a precoding matrix is selected from a group consisting of a discrete inverse Fourier transform for orthogonal frequency-division multiplexing (OFDM), an identity matrix for single-carrier transmission, a wavelet transform for multi-tone transmissions, a Hadamard matrix, and a channel-statistics matched adaptive filter.

8. The method of claim 1, further comprising:
    optimizing the block code using a gradient procedure;
    adapting dynamically the block code by feeding back channel state statistics from the transmitter;

varying a modulation level over space-time-frequency domain such that the ICI and ISI are minimized over typical or worst-case channel statistics; and changing a block transmission power such that interference is minimized.

9. The method of claim 2, comprising the steps for a linear-complexity non-coherent equalization:

expanding the block code with a basis over the space-time-frequency domain;

computing a quasi-null space of the expanded code block;

testing a likelihood over all possible null space code blocks;

updating a list of best likelihood symbols using an M-algorithm and a T-algorithm; and selecting a next data symbol to detect by a reordering process to suppress error propagation.

10. The method of claim 1, wherein the block code is designed based on statistics of the channel.

11. The method of claim 1, wherein the BEM is used in an iterative semi-blind equalizer based on an expectation-and-maximization (EM) procedure.

12. The method of claim 1, wherein the block uses quasi-unitary beta-distributed space-time modulation concatenated with trellis coding.

13. The method of claim 1, wherein the transmitter uses one or more antennas and the receiver uses one or more antennas.

14. The method of claim 4, further comprising the label design step in which pairwise error probability of all codeword pairs in STBC/SFBC/STFBC is calculated and changing the bit label assignment such that the union bound or lower bound of bit error rate is minimized by greedy hill-climbing methods or singular-value decomposition.

15. The method of claim 1, wherein the network uses wireless communication links.

16. The method of claim 1, wherein the network uses optical communication links.

17. A system for communicating data symbols in a wireless or an optical network, comprising:

a transmitter configured to transmit data symbols via a channel using modulation of a block code for non-coherent transmission, wherein the channel is modeled channel using the space-time-frequency basis expansion to represent inter-symbol interference (ISI) due to multipath delays and inter-carrier interference (ICI) due to time-varying fading, and the channel is approximated by a dominant Karhunen-Loeve transform (KLT) basis vectors, wherein a Legendre polynomial basis may be used over a time domain, and a Fourier basis may be used over a frequency domain; and a receiver configured to detect an output of the channel, wherein the detecting uses a generalized likelihood ratio test (GLRT) with soft-in soft-out space-time-frequency basis expansion to reproduce the data symbols.

* * * * *